(12) United States Patent
Lawandy

(10) Patent No.: US 12,523,588 B2
(45) Date of Patent: Jan. 13, 2026

(54) OPTICAL FORCE DIAGNOSTIC SYSTEMS AND METHODS

(71) Applicant: Nabil Lawandy, Saunderstown, RI (US)

(72) Inventor: Nabil Lawandy, Saunderstown, RI (US)

(73) Assignee: Solaris Biosciences, Inc., Providence, RI (US)

( * ) Notice: Subject to any disclaimer, the term of this patent is extended or adjusted under 35 U.S.C. 154(b) by 625 days.

(21) Appl. No.: 17/543,666

(22) Filed: Dec. 6, 2021

(65) Prior Publication Data

US 2023/0175939 A1    Jun. 8, 2023

(51) Int. Cl.
| | |
|---|---|
| G01N 11/00 | (2006.01) |
| G01N 15/0205 | (2024.01) |
| G01N 21/64 | (2006.01) |
| G01N 15/01 | (2024.01) |
| G01N 15/10 | (2006.01) |
| G01N 21/77 | (2006.01) |

(52) U.S. Cl.
CPC ......... *G01N 11/00* (2013.01); *G01N 15/0205* (2013.01); *G01N 21/6428* (2013.01); *G01N 21/6486* (2013.01); *G01N 2011/008* (2013.01); *G01N 15/01* (2024.01); *G01N 2015/1029* (2024.01); *G01N 2021/7759* (2013.01)

(58) Field of Classification Search
CPC ............... G01N 11/00; G01N 15/0205; G01N 2015/1029; G01N 21/6428
See application file for complete search history.

(56) References Cited

U.S. PATENT DOCUMENTS

| | | | | |
|---|---|---|---|---|
| 6,991,939 | B2 * | 1/2006 | Walt | G21K 1/006 |
| | | | | 422/82.07 |
| 8,537,356 | B2 * | 9/2013 | Ou-Yang | B01L 3/502761 |
| | | | | 250/225 |
| 11,920,930 | B2 * | 3/2024 | Adie | G01B 9/02034 |
| 2011/0008783 | A1 * | 1/2011 | Derick | G01N 21/6408 |
| | | | | 435/7.1 |
| 2017/0067815 | A1 | 3/2017 | Lawandy | |
| 2018/0106794 | A1 | 4/2018 | Lawandy | |

(Continued)

FOREIGN PATENT DOCUMENTS

JP    2017075857    * 10/2015

OTHER PUBLICATIONS

V. Glushko, M. Thaler, M. Ros, The fluorescence of bilirubin upon interaction with human erythrocyte ghosts, Biochimica et Biophysica Acta (BBA)—General Subjects, vol. 719, Issue 1, 1982.*

(Continued)

*Primary Examiner* — Rebecca C Bryant
(74) *Attorney, Agent, or Firm* — Pryor Cashman LLP

(57) ABSTRACT

A system and associated methods including a first light source directed at a sample, the first light source configured to move a plurality of particles within a medium of the sample in response to irradiation by the first light source; a second light source directed at the sample, the plurality of particles providing an optical response to irradiation by the second light source; and a detection system directed at the sample and capable of detecting the optical response of the plurality of particles moved by the first light source and irradiated by the second light source.

4 Claims, 9 Drawing Sheets

(56) References Cited

U.S. PATENT DOCUMENTS

2020/0200661 A1* 6/2020 Dajkovic ................ C12Q 1/02

OTHER PUBLICATIONS

International Search Report in PCT/US2022/052051 (Mar. 24, 2023).
Written Opinion of the International Searching Authority in PCT/US2022/052051 (Mar. 24, 2023).
Financial Times, Acquisition of interest—Solaris BioSciences, Inc—Company Announcements, Dec. 14, 2020, available at https://https://markets.ft.com/data/announce/detail?dockey=1323-14790953-6QTBCIOPP49PDPMSCCKKC3M0MI.

* cited by examiner

OPTICAL FORCE DIAGNOSTIC SYSTEMS AND METHODS

TECHNICAL FIELD

The present invention generally relates to systems and methods for measuring changes in the transport properties of particles, including nanoparticles, in fluids to determine the presence of compounds, such as proteins, antibodies, and cancer antigen markers, as well as the viscosity of fluids, particularly biofluids such as blood, blood plasma, spinal fluid, and ocular fluids. The present invention is based on the use of optical gradient forces to move particles, namely nanoparticles, added to or already present in the fluids and determining characteristic durations for reaching equilibrium in the light field or relaxation after the light field is terminated to determine viscosity or particle size changes arising from surface reactions affecting hydrodynamic radius.

BACKGROUND OF THE INVENTION

Plasma, which is a major component of blood, is composed primarily of water and includes several proteins, namely albumin, globulins ($\alpha$, $\beta$, $\gamma$), fibrinogen, and paraproteins, that affect the viscosity of the plasma. Blood plasma viscosity in humans has a normal range of 1.3-1.8 millipoise at 22° C. A patient's blood plasma viscosity outside and above this range may indicate an elevated level of these proteins from lymphoid malignancies. Moreover, high blood plasma viscosity may be indicative of an inflammatory response (e.g., infection, cytokine surges, surgical trauma, and hyperviscosity syndrome), thrombophilia, diabetes, cardiovascular disease, Alzheimer's disease, hematological cancer, myeloma, rheumatoid arthritis, and COVID-19 including long COVID-19 transition to an acute phase response. Moreover, severeness of COVID-19 symptoms and increased likelihood of developing blood clots have been associated with elevated plasma viscosity levels.

There are several known types of devices capable of measuring the dynamic viscosity of blood plasma, such as cone and plate viscometers and capillary viscometers. These devices have identified deficiencies, including requiring a large minimum sample size (approx. 1000 microliters or 1 cc), requiring direct fluid handling, requiring cleaning after each use, and having a long measurement time (approx. 20 minutes), all of which are exacerbated and made more costly by necessitating the assistance of commercial clinical diagnostic laboratories such as QUEST and LABCORP. Additionally, the devices themselves, such as the BENSON BV1 Semi-Automated Clinical Viscometer, are expensive, rendering them unfeasible for home use and non-laboratory applications. A rapid, accurate point-of-care blood plasma viscosity test could be used in connection with over 200 million tests performed each year in the United States, including for annual check-up visits, surgeries, cardiac-related emergency room visits, cardiologist visits, and Alzheimer's disease testing and tracking. Accordingly, there is a need for an inexpensive and rapid dynamic viscosity measurement mechanism for fluids such as blood plasma, preferably requiring a small sample size on the order of a pinprick droplet of blood.

Optical tweezers or single-beam gradient force traps are scientific instruments that use a highly focused laser beam to hold and move microscopic and sub-microscopic objects or particles such as atoms, nanoparticles, and droplets in a manner similar to the operation of actual tweezers. The basic principle of this technology is that light can exert forces on microscopic objects or particles. For optical tweezers, the laser beam provides an attractive or repulsive force on the objects or particles, depending on the relative refractive index between the relevant object or particle and the surrounding medium. Optical tweezers have been utilized in biology and medicine (e.g., grabbing and holding a single bacterium or cell), nanoengineering and nanochemistry (e.g., building materials from single molecules), and quantum optics and quantum optomechanics (e.g., studying the interaction of single particles with light). Arthur Ashkin received the 2018 Nobel Prize in Physics for the development of optical tweezers.

In general, objects or particles smaller than the wavelength of the light experience forces and acquire a potential energy in a non-uniform light field. A particle, such as a nanoparticle, in a light field will experience a force represented by the gradient of the energy in the light field and also a viscous drag when the particle moves through the medium. When a non-uniform light source is applied, the particles are dragged in the medium and their movement is determined by dynamic viscosity ($\eta$) and particle size or hydrodynamic radius (a), according to Stokes Law, $F=6\pi a \eta V$, where F is the force the medium exerts on the moving particle, $\eta$ is a function of temperature, and V is the particle velocity.

Ultimately, objects or particles, e.g., nanoparticles, in a medium with a lower index of refraction will move toward the regions having the highest intensity of the light field. Stated alternatively, light drags such objects or particles through the medium to the regions of highest intensity, with the distance, velocity, and time to reach a new steady state density distribution dependent on the viscosity of the medium and the hydrodynamic radius of the particles which may change as a result of surface reactions on the particles. The use of a probe beam for exciting fluorescent nanoparticles, a fluorescence from liquid medium with scattering nanoparticles, up-conversion from nanoparticles, or direct scattering of the probe beam can be used to monitor the nanoparticle dynamics after a second non-uniform optical beam is introduced into the system to initiate movement of the particles in the medium, such as blood plasma or ocular fluids.

SUMMARY OF THE INVENTION

In general, in one aspect, the invention features a system for measuring a viscosity of a medium containing a plurality of particles in a sample, including a first light source directed at the sample, the first light source configured to move the plurality of particles within the medium in response to irradiation by the first light source; a second light source directed at the sample, the plurality of particles providing an optical response to irradiation by the second light source; and a detection system directed at the sample and capable of detecting the optical response of the plurality of particles moved by the first light source and irradiated by the second light source.

Implementations of the invention may include one or more of the following features. The optical response of the plurality of particles may be one or more of fluorescence, scattering, absorption, or up-conversion. The medium may be blood plasma, blood, urine, ocular fluid, or spinal fluid. The sample may be configured as a test strip including the medium and the plurality of particles, and the test strip may be configured to separate blood plasma from a blood droplet by a paper membrane or a polymer membrane or configured to separate hematocrit from blood plasma by a paper membrane or a polymer membrane.

The first light source may have less focus and a higher power than the second light source. The sample may have a first side and a second side opposite to the first side, where the first light source is directed at the first side of the sample and the second light source is directed at the second side of the sample. The second light source may be a fluorescent excitation laser, where the plurality of particles include fluorescent nanoparticles, nanoparticle-fluorescent particle bound complexes, or both nanoparticles and fluorescent particles, and where the detection system is configured to detect fluorescence. The second light source may be a laser that is not absorbed by the medium or any constituents of the medium including the plurality of particles, where the plurality of particles include up-converting nanoparticles, and where the detection system is configured to detect up-conversion. The plurality of particles may include scattering nanoparticles, where the detection system is configured to measure changes in scattered light in response to irradiation of the scattering nanoparticles by the second light source. The plurality of particles may include fluorescent nanoparticles that exhibit photodegredation in the presence of the second light source.

The plurality of particles may include moieties and the medium may include a biofluid, the biofluid being blood plasma, blood, urine, ocular fluid, or spinal fluid. The plurality of particles may include an albumin-bilirubin bound complex.

In general, in another aspect, the invention features a method for measuring a viscosity of a medium containing a plurality of particles in a sample including directing a first light source at the sample, the first light source configured to move the plurality of particles within the medium in response to irradiation by the first light source; directing a second light source at the sample, the plurality of particles providing an optical response to irradiation by the second light source; and detecting the optical response of the plurality of particles moved by the first light source and irradiated by the second light source.

Implementations of the invention may include one or more of the following features. The optical response of the plurality of particles may be one or more of fluorescence, scattering, absorption, or up-conversion. The method may further include providing the sample including blood plasma, blood, urine, ocular fluid, or spinal fluid as the medium, and determining the presence of an abnormal blood plasma viscosity level.

In general, in another aspect, the invention features a method for determining the presence of a target compound bound to one or more of a plurality of particles in a medium containing the plurality of particles in a sample including directing a first light source at the sample, the first light source configured to move the plurality of particles within the medium in response to irradiation by the first light source; directing a second light source at the sample, the plurality of particles providing an optical response to irradiation by the second light source; and detecting the optical response of the plurality of particles moved by the first light source and irradiated by the second light source.

Implementations of the invention may include one or more of the following features. The optical response of the plurality of particles may be one or more of fluorescence, scattering, absorption, or up-conversion. The method may further include providing the sample including blood plasma, blood, urine, ocular fluid, or spinal fluid as the medium, and determining the presence of the target compound, the target compound being one or more of carcinoembryonic antigen (CEA), CD19, CD20, and CA 125.

DETAILED DESCRIPTION OF THE PREFERRED EMBODIMENTS

The present invention is directed to a system and method for measuring the viscosity of a medium, e.g., fluid, and/or the change in hydrodynamic radius of a particle due to specific surface reactions thereon, particularly in biofluids including but not limited to blood plasma, blood, urine, ocular fluid, and spinal fluid. The measured dynamics and time constants to reach a steady state in response to a non-uniform optical beam can determine the viscosity or the change in particle size due to chemical reactions with specific moieties in the medium and can be used for diagnostic purposes concerning viscosity as well as assays for determining the presence of specific compounds, e.g., proteins and antibodies, including trace amounts of such compounds.

In certain embodiments of the present invention, including those directed to viscosity measurement and assays with surface-functionalized nanoparticles, the sample is produced by a pinprick volume of blood, whereby the hematocrit is separated from the plasma using a paper or polymer membrane and the clear plasma is moved via capillary action into a region where the cell is transparent. The volume of the sample may be on the scale of one hundred nanoliters, and the thickness of the sample may be on the scale of ten microns to several hundred microns.

Figure 1A:
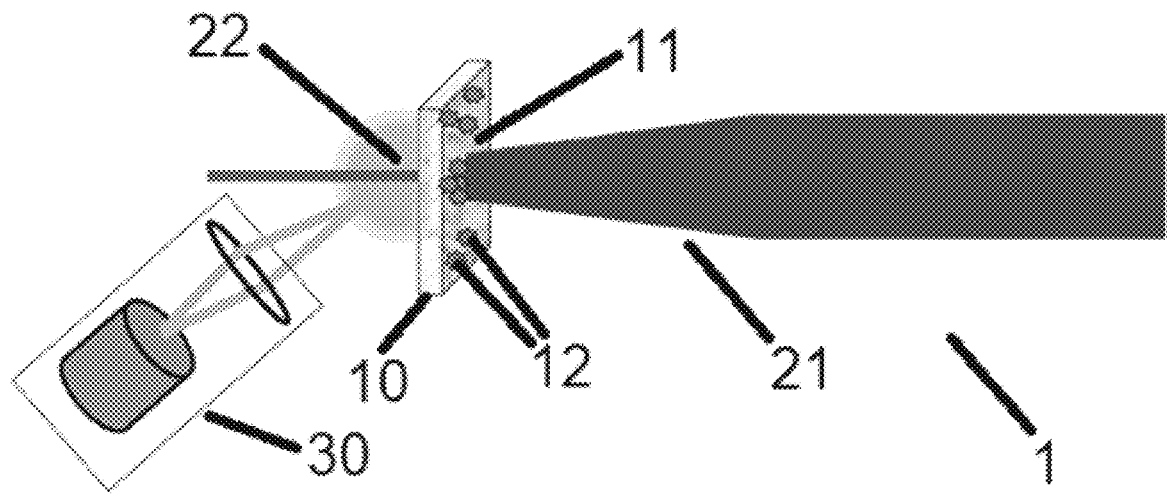
FIG. 1A illustrates an overview of an optical force diagnostic system of the present invention.

FIG. 1A is an illustration providing an overview of the system of the present invention. The system 1 of FIG. 1A includes two laser light sources directed at sample 10 including medium 11 and particles 12 such as nanoparticles. Preferably, the light sources are a less focused, high-power laser 21 to effectuate particle dragging in the medium of the sample and a highly focused, low-power laser 22 for effecting an optical response of the particles. System 1 also includes a detection system or apparatus 30 for detecting the optical response of the particles that are moved by high-power laser 21 and irradiated by low-power laser 22.

The laser sources of the present invention may be diode lasers. The power of the highly focused, low-power laser may be on the scale of nanowatts to milliwatts, and the power of the less focused, high-power laser may be on the scale of milliwatts and is preferably higher than that of the highly focused, low-power laser. While the laser sources are shown in FIG. 1A to be co-linear, the present invention allows for any arrangement in which the light sources intersect each other at, on, or in the sample, including light sources directed non-perpendicularly to the plane of the sample and/or emanating from the same side of the sample.

Figure 1B:
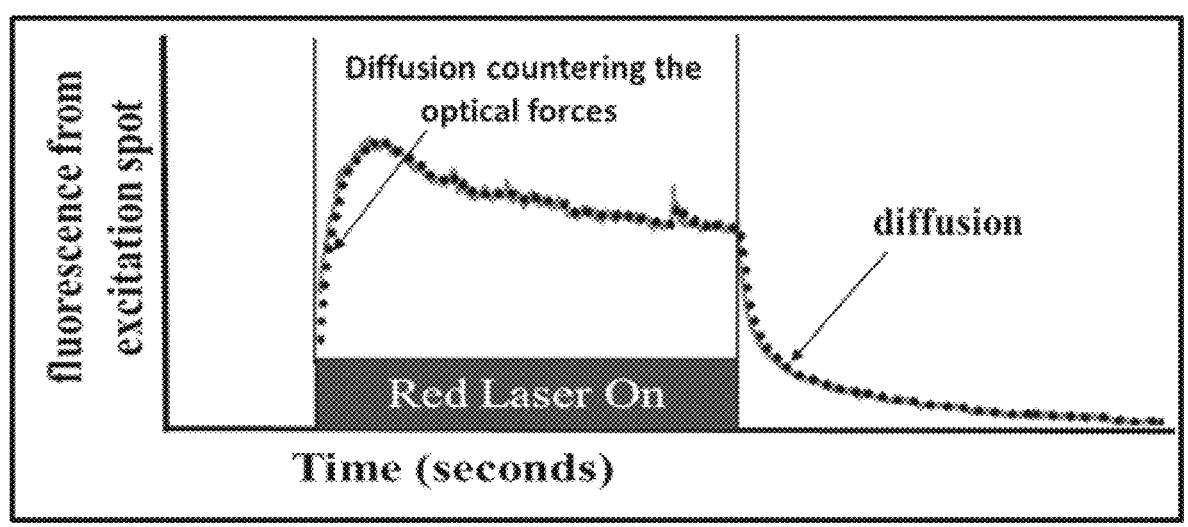
FIG. 1B illustrates a graphical representation of fluorescence over time during a process of operating an optical force diagnostic system of the present invention.

FIG. 1B shows a graph of fluorescence over time in which the highly focused, low-power laser, e.g., a blue laser, excites fluorescing nanoparticles in a sample over an identified time period while the less focused, high-power laser, e.g., a red laser, is turned on and off at certain points within the time period. Dragging of the nanoparticles toward a high intensity region of a high-power laser beam occurs during a time period in which the less-focused high-power laser is turned on and directed at the sample, which produces diffusion-countering optical forces.

Further with respect to the mechanism shown in FIG. 1B, the less focused, high-power laser acts as the drag laser or tractor beam. When this laser is directed at the sample, a gradient of potential energy (U), i.e., a force (F), is created, namely:

$$F_x = \frac{-\partial U}{\partial x}$$

Figure 8:
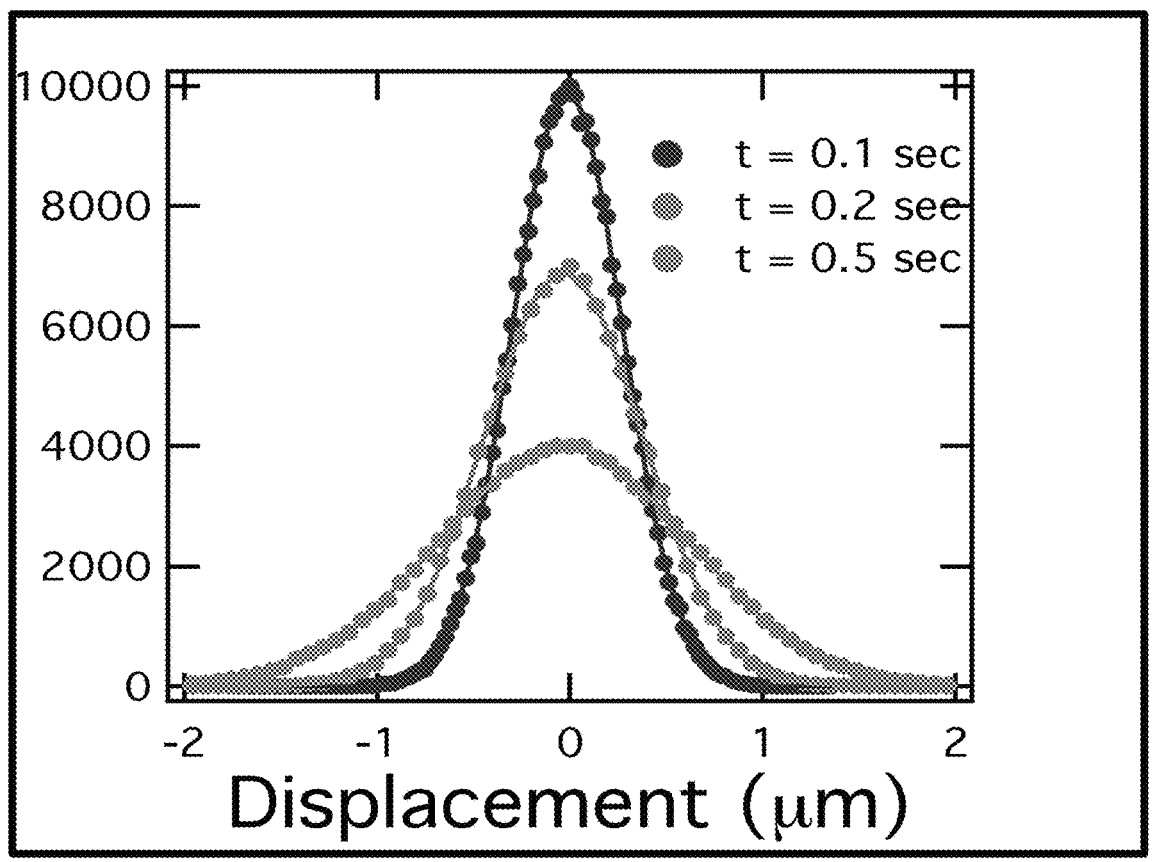
FIG. 8 illustrates a graphical representation of a relaxation of a light-induced nanoparticle density profile over time.

To accomplish the mechanism of the present invention, the relevant particles are polarizable. As a result of irradiation by the high-power laser, the nanoparticles are dragged to a position in the medium corresponding to the location in which the center of the laser is focused, i.e., creating a flux focused toward the high intensity region of the tractor beam. The medium develops a flux in relation to the laser beam, with the position in the medium having the lowest potential energy being the location in which the directed light is most intense, resulting in the nanoparticles disposed in the medium moving toward this location. The rate at which the density of particles builds up depends on viscosity of the medium and the hydrodynamic size of the particles. Simultaneously with the dragging effects on the nanoparticles caused by the tractor beam laser, there are counterbalancing diffusion effects on the nanoparticles in the medium. Removal of the high-power laser results in a diminution of the density and permits diffusion of the nanoparticles back to a uniform distribution. The diffusion effects cause the nanoparticles to move away from the high-intensity region of the tractor beam, as shown in FIG. 8. A steady state is achieved when the flux associated with the light force is balanced by the flux associated with the diffusion, the steady state being reached when there is a non-uniform light intensity. Ultimately, the rate at which the nanoparticles are dragged toward the high-intensity region of the high-power laser beam depends on particle size, the intensity of the laser beam, the shape of the laser beam, and the viscosity of the medium. For laser beams that may be employed in the present invention, the radial component of the beam dominates the gradients and thus the forces, concentrating the nanoparticles in both the center and the waist of the beam.

While a non-limiting embodiment of the present invention utilizes the aforementioned drag laser or tractor beam, the present invention may utilize any type of light or light source capable of altering the potential energy profile of the relevant medium. In an alternative embodiment, the light is in the form of a moving intensity grating pattern created by interfering laser beams in the medium. This results in the particles moving, i.e., being dragged, within the medium to the location at which the light source is directed, as previously described. In another embodiment, a nondegenerate two-wave mixing mechanism may be utilized, such as that described in U.S. Pat. Nos. 9,970,854 and 10,379,114, both of which are incorporated by reference herein. In the case of a nondegenerate two-wave mixing mechanism, the particles are dragged into a grating arrangement focused at the high intensity locations of the pattern of a moving interference pattern, thus accumulating at multiple locations within the medium, namely near the peaks of the interfering optical waves, rather than at a single location as is the case with the use of a single tractor beam.

The highly focused, low-power laser acts as a probe beam. Preferably, the probe beam has a smaller diameter than the drag laser or tractor beam. As discussed herein, measurement of the viscosity of the medium is achieved in part due to the utilization of a probe beam directed at the sample. While the probe beam shown FIG. 1A is a fluorescent excitation laser, the present invention is not limited to fluorescence detection. In particular, the nanoparticles may scatter the probe beam, fluoresce in response to the probe beam, absorb the probe beam, provide an up-conversion function, and provide other optical responses. In other embodiments, a fluorescent dye may be included in the medium, where the fluorescence of the dye particles is affected by scattering by the nanoparticles acted upon by the tractor beam. The probe beam may be used to monitor the peak of the distribution of the nanoparticles or the density of the nanoparticles within areas of the medium. The density of the nanoparticles at a particular time after application of the high-power tractor beam is an indicator of the viscosity of the medium.

Figure 11:
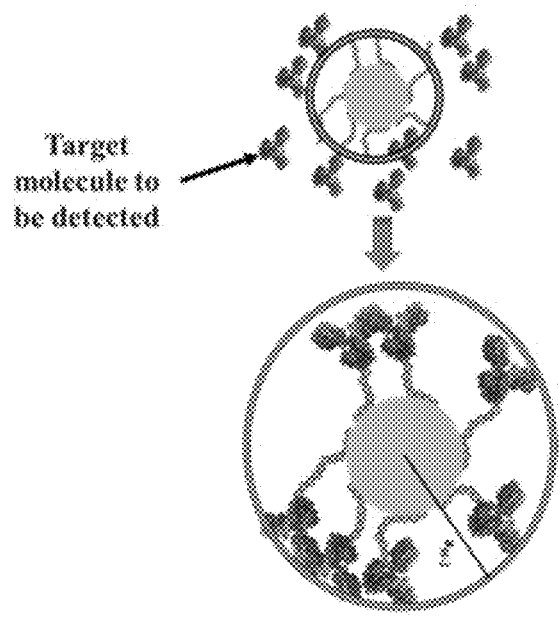
FIG. 11 illustrates a relationship between surface-bound target moieties or antigens and core particles.

In another embodiment of the present system, the system compares the duration for reaching a certain value relative to the equilibrium value for a surface-functionalized nanoparticle in a solution without a specific antigen or moiety to the duration for reaching the same value in a solution which contains the target moiety or antigen. FIG. 11 illustrates a relationship between surface-bound target moieties or antigens and core particles. The solution with the assay target molecule results in surface reactions with the specific functional groups, and alters the hydrodynamic radius and the duration for reaching steady state with the light source activated as well as the duration for relaxation via diffusion when the relevant dragging light source and its gradient are inactivated. Surface reactions may concern but are not limited to the use of antibody-coated nanoparticles to detect antigen (protein) disease markers, or proteins to detect antibodies specific to that protein, including cancer markers, such as carcinoembryonic antigen (CEA), CD19, CD20, and CA 125.

Additionally, the present invention may feature an assay capability for determining the presence of a target compound/molecule by using surface-functionalized nanoparticles having specific molecules on their surface that have a high and specific binding affinity to the target compound/molecule to be detected in the fluid. Examples of specific molecules attached to the nanoparticle surface to functionalize said surface are antibodies capable of selectively binding to a specific antigen (protein) in the solution. Another example is functionalizing the nanoparticle surface with proteins that will selectively bind to target antibodies in the solution. The binding of the target compounds/molecules to the specific nanoparticle-surface molecules used to functionalize said surface will change the hydrodynamic radius of the nanoparticles and affect the rate of motion and the time scale for reaching equilibrium in the presence of the first light source. This change in the time to reach equilibrium relative to the behavior of the same functionalized nanoparticles in a solution without such target compounds/molecules will indicate the presence of the target compounds/molecules and provide an assay function to detect extremely small amounts of the target compounds/molecules.

A detector capable of detecting the optical response caused by the application of the probe beam on the nanoparticles in the medium provides a predictable, relative measure of the duration for reaching steady state in the specific sample. For example, the detector may determine the level of fluorescence, scattering, absorption, or up-conversion of the nanoparticles or associated dye particles in the medium.

Figure 2A:
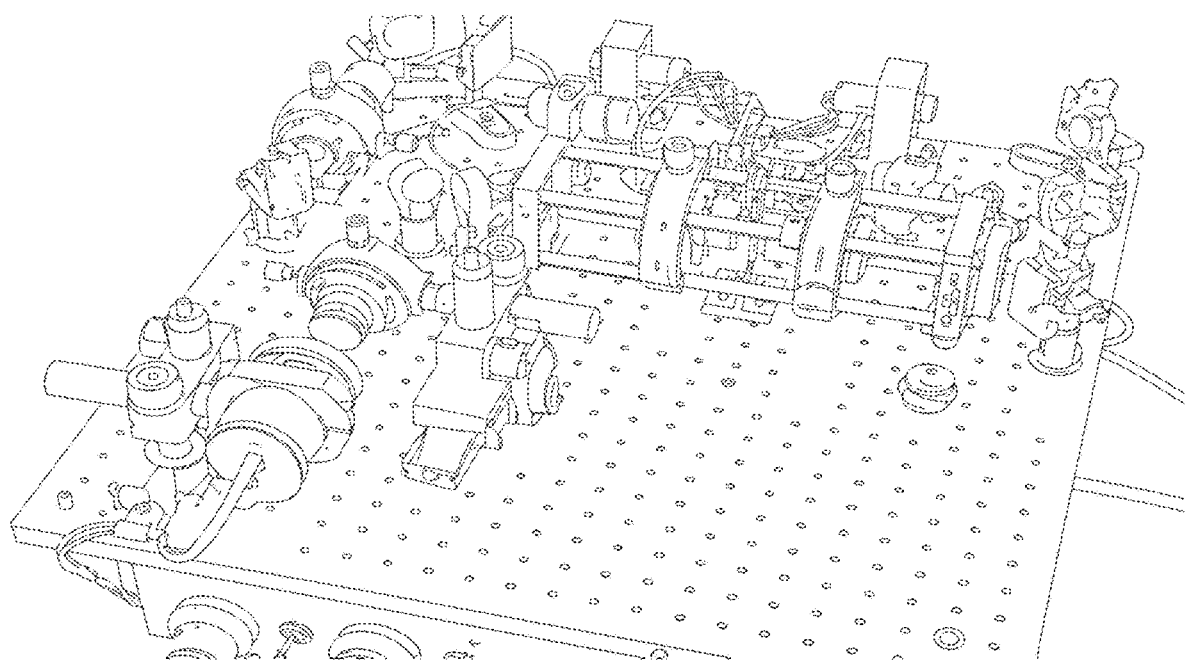
FIG. 2A illustrates an optical force diagnostic system of the present invention at a first point in operation.
Figure 2B:
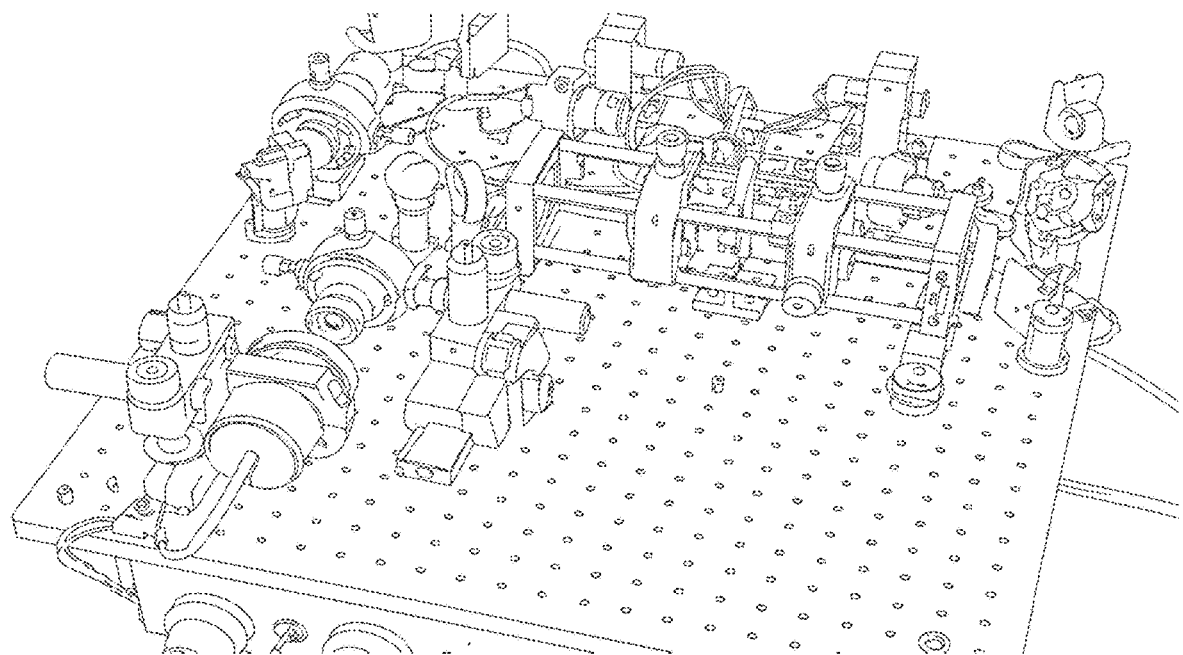
FIG. 2B illustrates the optical force diagnostic system of FIG. 2A at a second point in operation.

FIGS. 2A-2B illustrate a non-limiting example of an optical force diagnostic system of the present invention. In FIG. 2A, a highly focused, low-power laser, e.g., blue laser, is irradiating the relevant sample. In FIG. 2B, both the highly focused, low-power laser, e.g., blue laser, and a less focused, high-power laser, e.g., red laser, are irradiating the relevant sample.

Figure 3A:
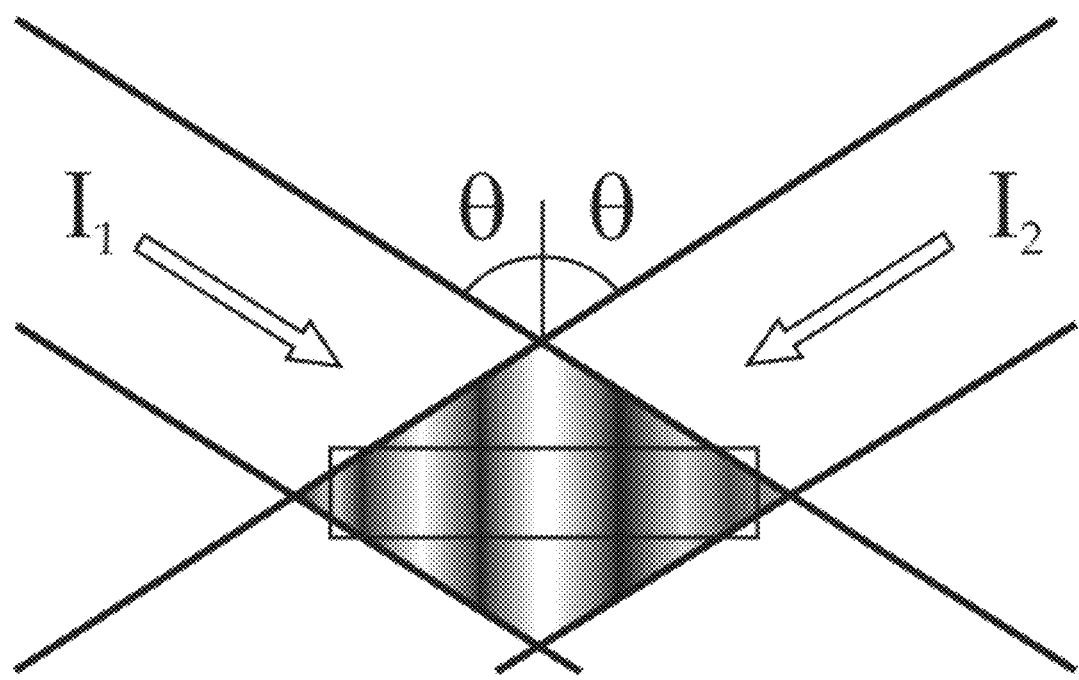
FIG. 3A illustrates the intensities of two interfering optical waves.
Figure 3B:
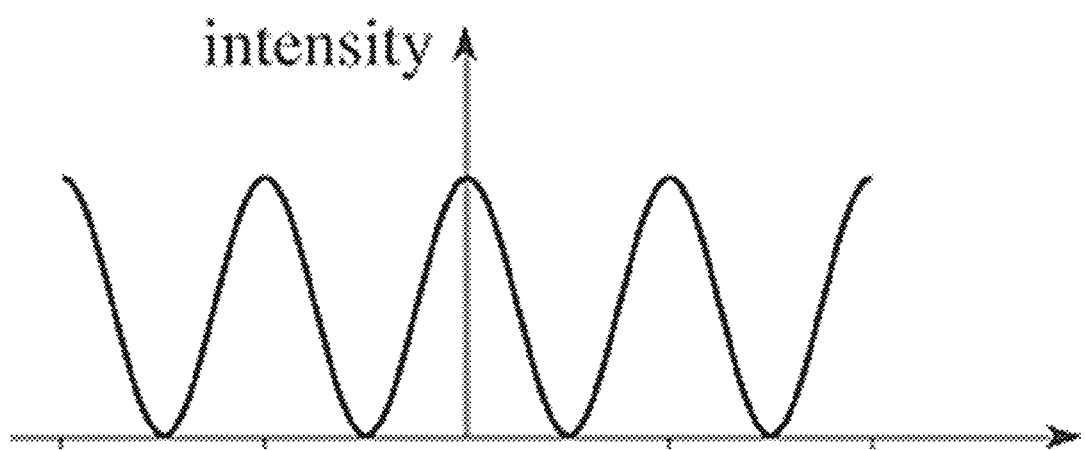
FIG. 3B illustrates a standing wave intensity grating pattern formed by the two interfering optical waves of FIG. 2A.

FIG. 3A illustrates the case of nondegenerate two-wave mixing being used as the particle dragging light source. The intensities of two optical waves represented by $I_1$ and $I_2$, both at an angle $\theta$ to a normal, create an intensity grating pattern in the form of a standing wave as illustrated in FIG. 3B. The total intensity of the interfering optical waves may be represented as follows:

$$\langle |E_{total}(P, t)|^2 \rangle_{time\ avg.} = \frac{a_1^2(P)}{2} + \frac{a_2^2(P)}{2} + a_1(P)a_2(P)\cos(\phi_1(P) - \phi_2(P))$$

The total intensity is then (in MKS units).

$$I_{total}(P) \equiv \varepsilon_0 c \langle |E_{total}(P, t)|^2 \rangle_{time\ average}\ (W/m^2)$$
$$= \varepsilon_0 c \frac{a_1^2(P)}{2} + \varepsilon_0 c \frac{a_2^2(P)}{2} + \varepsilon_0 c a_1(P)a_2(P)\cos(\phi_1(P) - \phi_2(P))$$
$$= I_1(P) + I_2(P) + 2\sqrt{I_1(P) \cdot I_2(P)\cos(\phi_1(P) - \phi_2(P))}.$$

In the case of identical optical waves having intensity I and differing only in phase, the total intensity $I_{total}$ reduces to the representation $I_{total}=2I+2I \cos((4\pi/\lambda)x)$.

Figure 4:
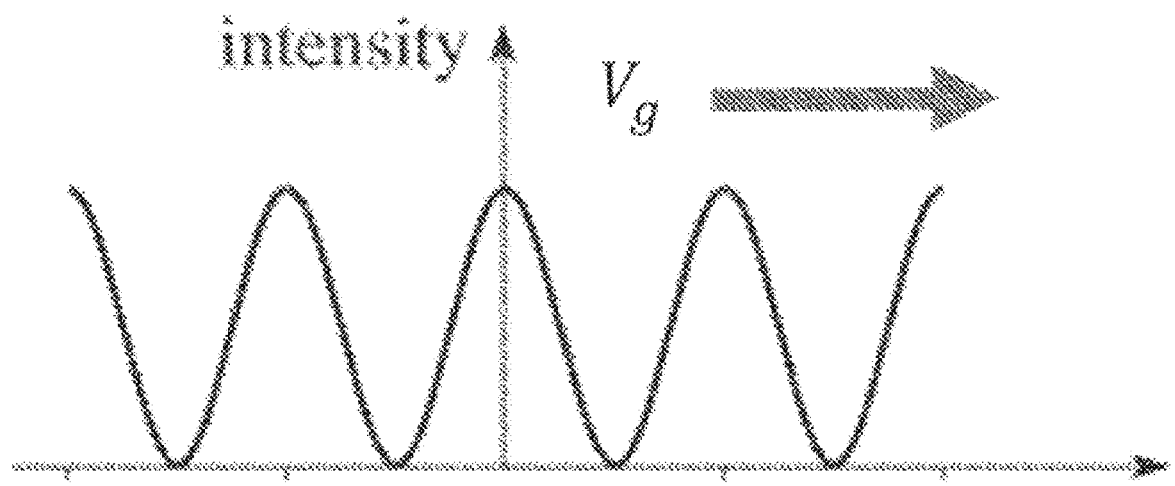
FIG. 4 illustrates a traveling intensity grating pattern formed by two interfering optical waves having a small difference in frequency.

When two optical waves of frequency $\omega$, such as beams emanating from focused low-power solid-state lasers, have a slight difference in their frequency $\delta\omega$, the intensity grating pattern moves at a speed $V_g$, as illustrated in FIG. 4, according to the following relation:

$$V_g = \frac{\delta\omega}{2\omega}c$$

The frequency shift $\delta\omega$ is directly proportional to the speed $V_g$. Additionally, two interfering laser sources produce a periodic intensity grating with a period of half the axially-projected wavelength of the laser radiation.

When a dielectric particle is placed in an electric field, it develops an induced dipole moment, which in turn interacts with the field itself to lower the energy of the particle. The force F felt by a dipole in an electric field, once oriented, is given by:

$$F = \mu \frac{\partial E}{\partial x}$$

If the dipole is induced by the same electric field having the polarizability $\alpha$, then $\mu=aE$, and the energy of the particle is related to the magnitude of the electric field E, where $\langle E^2 \rangle$ is proportional to the local intensity of the light, as follows:

$$\text{Energy} = -1/2\alpha \langle E^2 \rangle \text{ where } \alpha = 4\pi \frac{n^2-1}{n^2+2}a^3 \quad (MKSA \text{ units})$$

where a is the hydrodynamic radius.

This results in a time-averaged force $F_g$ on the particle given by $$\langle F_g \rangle = (1/4)\varepsilon_0 \varepsilon_h \text{Re}(\alpha) \nabla |E^2|$$

Figure 5:
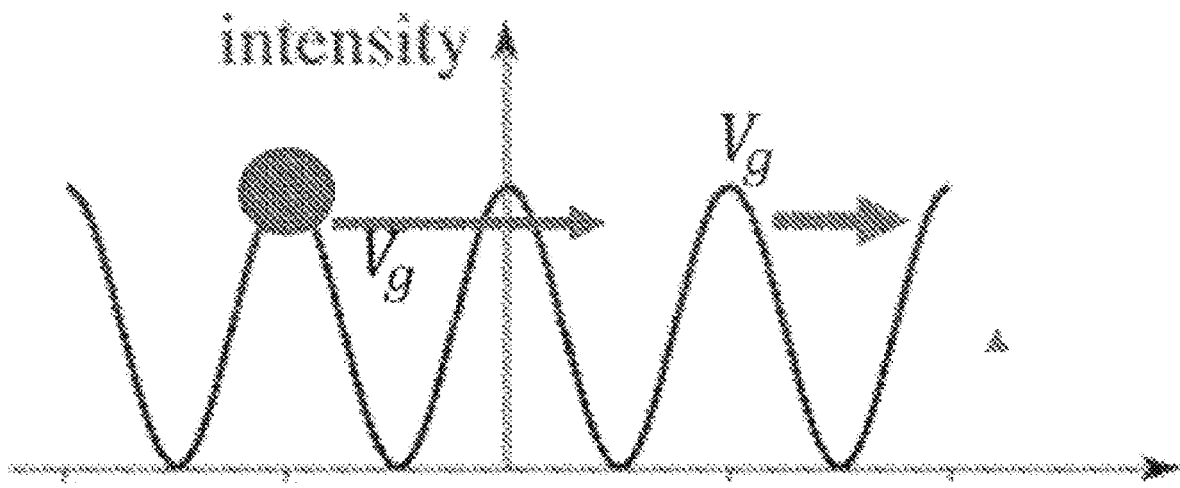
FIG. 5 illustrates particles in high intensity of interfering waves with no frictive forces.

If there were no viscous forces acting on the particle's movement in the solution, the particle would remain exactly at the center of the regions of high intensity of interfering waves, as illustrated in FIG. 5. Newton's equations of motions would be satisfied when the particle is on one of the peaks of the intensity grating of the interfering waves and remains at that peak by moving at the same velocity as the grating in the case of two waves with a difference in frequency.

Figure 6:
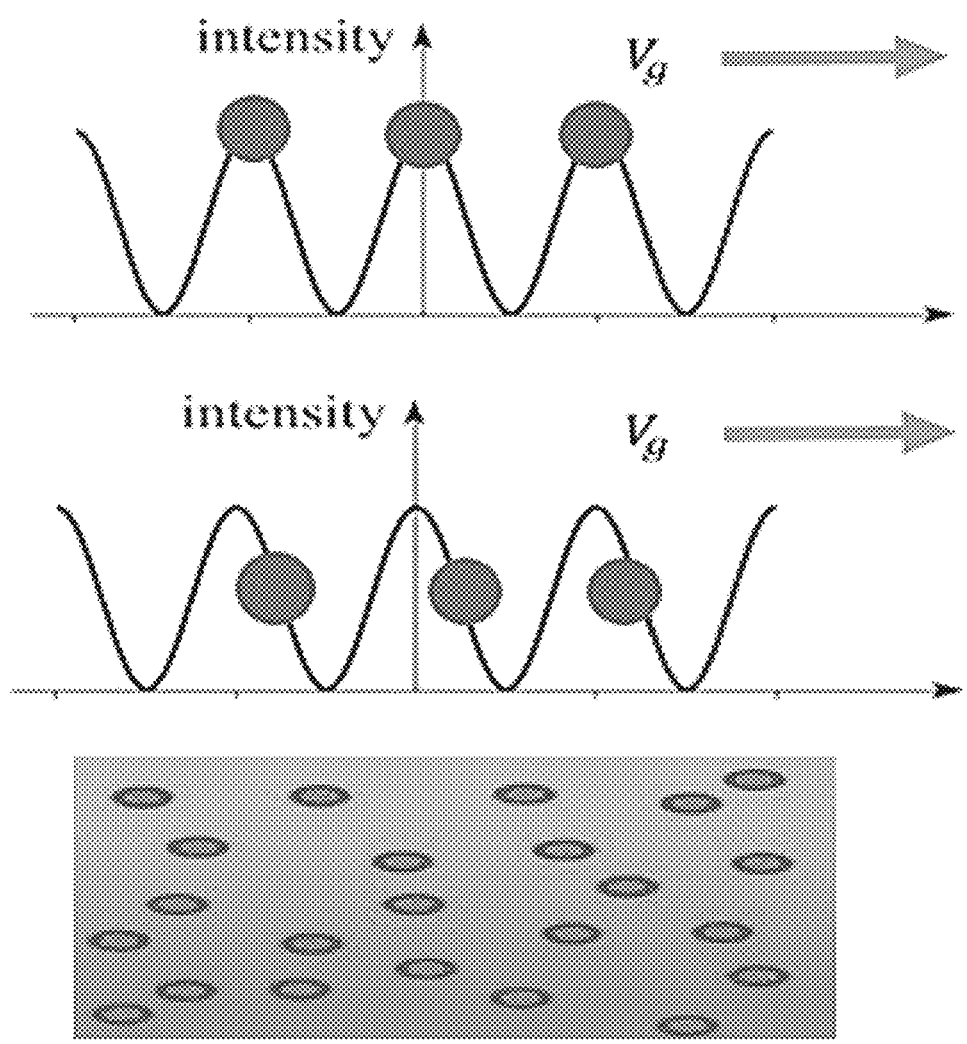
FIG. 6 illustrates particles following the intensity grating of interfering waves with friction.

In a solution such as water, the particle experiences friction or drag proportional to the viscosity of the liquid and the radius of the particle. Stoke's Law provides a quantification of the drag force $F_d$ as the particle travels through a fluid as $F_d=6\pi r\eta v$, where r is the radius of a sphere representing the particle, $\eta$ is the viscosity of the fluid, and v is the speed of the sphere. The friction or drag causes the particle to follow the intensity grating of the interfering optical waves, as shown in FIG. 6.

If the intensity grating moves very slowly, the particles will follow the intensity grating at its peaks. If the intensity grating moves too quickly, the particles will not follow the intensity grating and on average will not move along with the intensity grating. When there are many particles, the particles arrange themselves in a particle grating and move along with the intensity grating if they are able to do so. In particular, at slow grating speeds having a small frequency shift between the interfering optical waves, the particles form a particle grating that is aligned with the moving intensity maxima. At intermediate grating speeds, the particles are trapped in high intensity regions and move with the intensity grating to form a particle grating that moves along with the intensity grating, but is displaced from the intensity peaks; i.e., the particle grating is out of phase with the intensity grating. At high grating speeds, the particles cannot follow the intensity grating at all, and no particle grating is formed.

Figure 7:
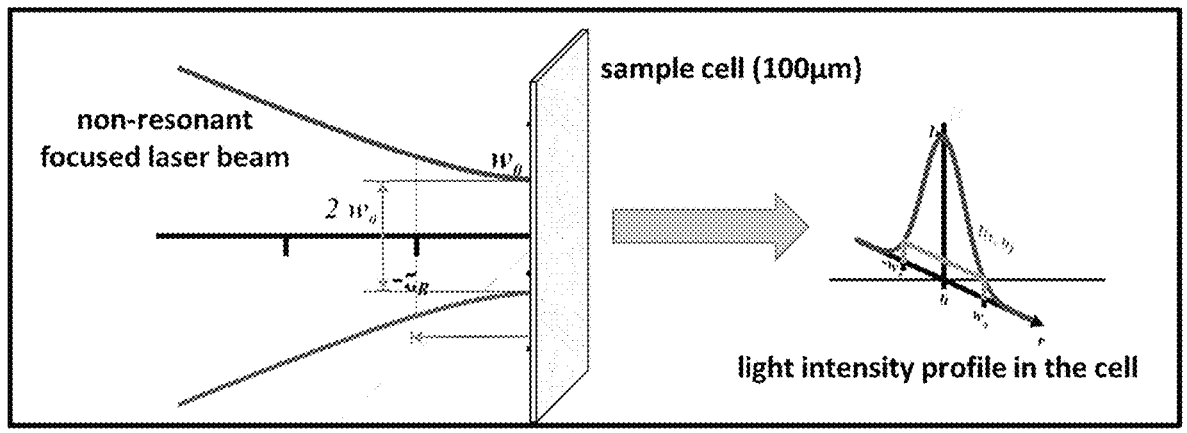
FIG. 7 illustrates an overview of nanoparticle dragging in which the spatial pattern of the nanoparticles mirrors the light pattern.

Another illustration of particle dragging, particularly for nanoparticles, is shown in FIG. 7. A single non-resonant focused laser beam is directed at a sample cell and drags nanoparticles within its volume into a peaked distribution, with the spatial pattern of the nanoparticles mirroring the light intensity pattern. In the case of a focused laser beam, the major force is in the radial direction as the focus spot is much smaller than the Rayleigh length over which the beam focuses and expands. Additionally, reversal or relaxation of the light-induced nanoparticle density profile is possible, such as by turning off the laser or light source and permitting the nanoparticles to return to a uniform density distribution by diffusion, as shown in FIG. 8. The decay of fluorescence by the particles returning to the initial uniform distribution depends on the diffusion coefficient of the particles. The relaxation time and shape can be also be used to determine the size of the particle which, in turn, indicates a surface binding reaction has occurred, thereby providing another methodology for a target molecule assay.

While embodiments described above rely on a fluorescence associated with the selected nanoparticles, the nanoparticles need not necessarily be fluorescent nanoparticles. Other examples include up-converting nanoparticles and scattering nanoparticles. In the embodiment where the nanoparticles are up-converting nanoparticles, the highly focused, low-power laser may be an infrared (IR) beam and/or any laser that is not absorbed by the medium (e.g., biofluid) or any constituents of the medium including the nanoparticles. In the embodiment where the nanoparticles are scattering nanoparticles, the detection system may measure changes in the scattered light. Additionally, photodegradable nanoparticles or dye added to the medium or naturally-present fluorescent moieties may also be utilized in connection with the present invention, such as for enhancing the fluorescent changes created by the optical forces of the first light source when a steady state fluorescence is created by a balance of photodegradation and diffusive replenishment prior to activation of the first light source. Such fluorescent nanoparticles, added dyes, or naturally-present fluorescent moieties may exhibit photodegredation in the presence of the second light source to enhance the changes in fluorescence by the tractor beam.

Figure 9:
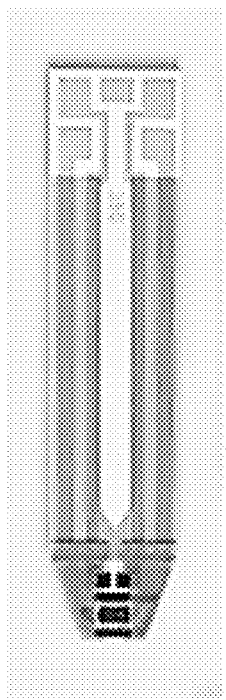
FIG. 9 illustrates a test strip according to one embodiment of the present invention.

The relevant sample of the present invention, such as a sample of blood plasma, may be held or retained in a test strip, such as that depicted in FIG. 9. This approach uniquely provides for non-contact measurement with respect to the relevant sample, as all other known viscometers require handling such that the liquid contacts the device. In one embodiment of the present invention, the test strip includes surface-functionalized nanoparticles for binding with specific target molecules, compounds, and the like. Exemplary nanoparticles include gold, silica, and polystyrene, which have been demonstrated in the art as capable of surface functionalization with thousands of various ligands. Accordingly, the surface-functionalized nanoparticles may react with molecules, compounds, and materials, including aforementioned components of blood plasma, e.g., proteins, with the resultant product being a larger complex affecting both diffusivity and viscosity, which may be observed with an optical force diagnostic system of the present invention applying principles of laser drag.

In another embodiment of the present invention, the test strip does not include any surface-functionalized nanoparticles; rather, the relevant objects or particles being moved, i.e., dragged, within the test strip by the light source are existing moieties in the biofluid. Accordingly, no additional nanoparticles, including surface-functionalized nanoparticles, are required to measure the viscosity and attendant diffusivity. In such embodiments, the fluorescing nanoparticles, or both the relevant nanoparticles and the fluorescing particles, are already disposed in the examined medium, e.g., blood plasma which includes water, albumin, and bilirubin. In another embodiment, additional particles are added to bind with bilirubin in blood plasma. In yet another embodiment, albumin and bilirubin are bound together, forming a complex capable of fluorescing naturally or with the aid of an appropriate dye.

Figure 10:
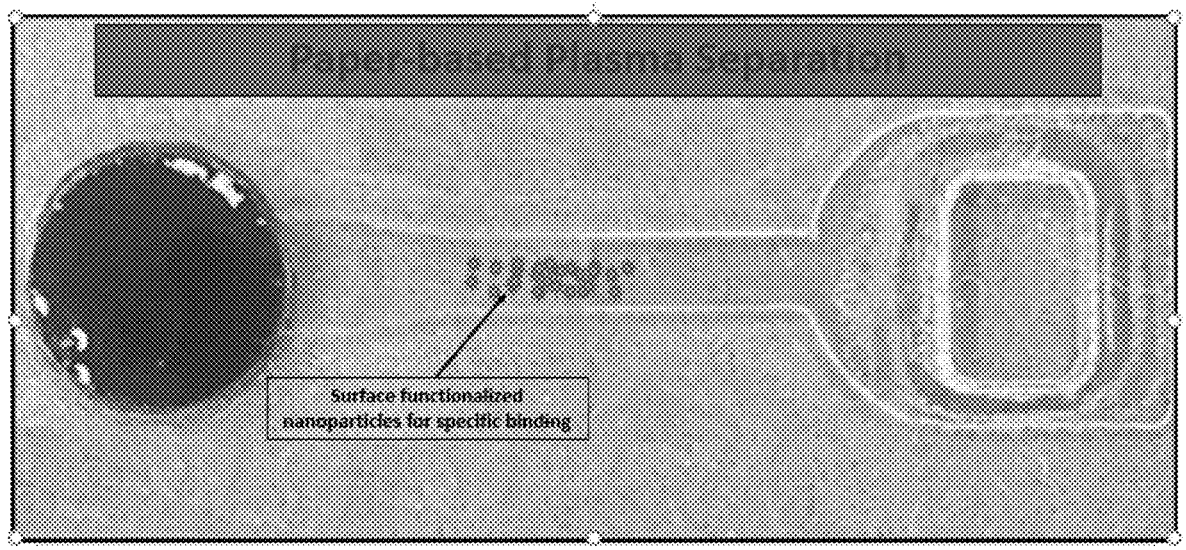
FIG. 10 illustrates a paper-based plasma separation mechanism according to one embodiment of the present invention.

In an embodiment of the present invention in which the relevant sample is blood plasma, the test strip should first function to separate the plasma from the blood, such as in the instance of a droplet of blood resulting from a lancet prick, e.g., finger prick. Plasma separation may be accomplished through employing one of various membranes, including paper and polymer membranes, in the test strip. FIG. 10 provides a non-limiting example of such plasma separation, namely through a paper-based plasma separation mechanism. The optically-clear plasma is separated from the droplet of blood and transported along the channel, which includes surface-functionalized nanoparticles for specific binding, as described above. In this embodiment, 50% volumetric separation occurs in only 30 seconds, and greater than 85% volumetric separation occurs in only 45 seconds.

Figure 12A:
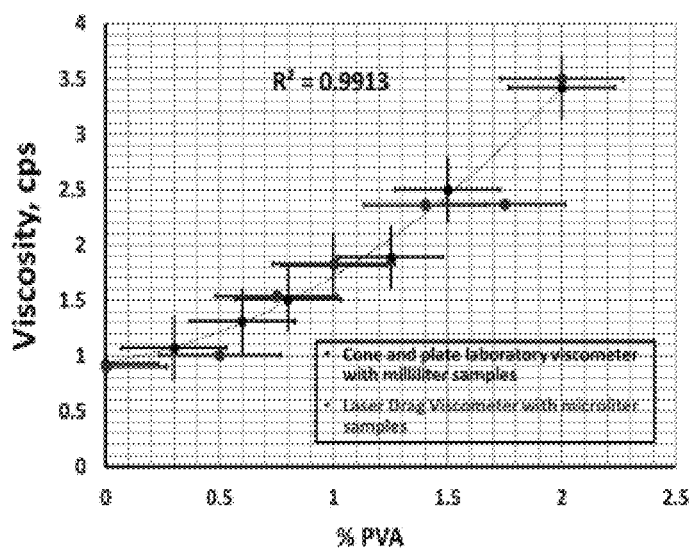
FIG. 12A illustrates a first aspect of a comparison between an optical force diagnostic system of the present invention and a cone and plate viscometer.
Figure 12B:
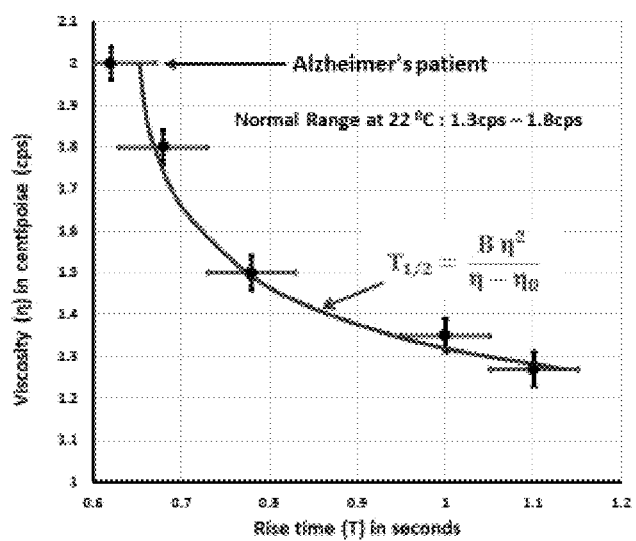
FIG. 12B illustrates a second aspect of a comparison between an optical force diagnostic system of the present invention and a cone and plate viscometer.

FIGS. 12A-12B provides a comparison between an optical force diagnostic system of the present invention and a cone and plate viscometer, particularly as relating to viscosity of controlled viscosity and blood plasma. In FIG. 12A, a controlled solution, i.e., calibration solution, was employed, with the solution comprising water, 200 nm fluorescent polystyrene spheres, and polyvinyl alcohol (PVA, 90 kD). For the cone and plate viscometer (Brookfield), measurements were performed with 1 mL of the solution. For the optical force diagnostic system of the present invention, optical force measurements, i.e., laser drag measurements, were performed with only 10 μL of the solution. Accordingly, with the present invention, accurate viscosity determinations may be made with a much smaller sample size, i.e., volume, as compared to other commercially-available viscometers.

FIG. 12B concerns a blood plasma sample obtained from a subject previously identified as afflicted with Alzheimer's disease. The blood plasma sample included only naturally-present compounds, namely albumin with conjugated bilirubin, rather than the fluorescent polystyrene spheres described in connection with FIG. 12A. For the cone and plate viscometer (Brookfield), measurements were performed with 1 mL of the sample. For the optical force diagnostic system of the present invention, optical force measurements, i.e., laser drag measurements, were performed with only 10 μL of the sample. Based on these measurements, as reflected in FIG. 12B, the theoretical expression fits the measurement data to 5%. Again, the present invention is capable of providing accurate viscosity determinations with smaller sample sizes than other commercially-available viscometers.

The embodiments and examples above are illustrative, and many variations can be introduced to them without departing from the spirit of the disclosure or from the scope of the invention. For example, elements and/or features of different illustrative and exemplary embodiments herein may be combined with each other and/or substituted with each other within the scope of this disclosure. Therefore, it is intended that the invention not be limited to the particular embodiments disclosed, but that the invention will include all embodiments falling within the scope of the claims. For a better understanding of the invention, its operating advantages and the specific objects attained by its uses, reference should be had to the accompanying drawings and descriptive matter, in which there is illustrated a preferred embodiment of the invention.

What is claimed is:

1. A method for measuring medium viscosity, comprising:
   directing a first light source at a sample, the first light source configured to move a plurality of particles within a medium in the sample in response to irradiation by the first light source;
   directing a second light source at the sample, the plurality of particles providing an optical response to irradiation by the second light source, wherein the optical response of the plurality of particles is fluorescence;
   detecting the optical response of the plurality of particles moved by the first light source and irradiated by the second light source; and
   measuring a viscosity of the medium containing the plurality of particles based on the detected optical response.

2. The method of claim 1, further comprising:
   providing the sample comprising blood plasma, blood, urine, ocular fluid, or spinal fluid as the medium; and
   determining the presence of an abnormal blood plasma viscosity level.

3. A method for determining target compound presence, comprising:
   directing a first light source at a sample, the first light source configured to move a plurality of particles within a medium in the sample in response to irradiation by the first light source;
   directing a second light source at the sample, the plurality of particles providing an optical response to irradiation by the second light source;
   detecting the optical response of the plurality of particles moved by the first light source and irradiated by the second light source, wherein the optical response of the plurality of particles is fluorescence; and
   determining, based on a measurement of the optical response of the plurality of particles in a control medium without the target compound, the presence of the target compound bound to one or more of the plurality of particles in the medium based on the detected optical response and a measured change in time to reach equilibrium for the medium with the plurality of particles relative to the control medium without the target compound.

4. The method of claim 3, further comprising:
   providing the sample comprising blood plasma, blood, urine, ocular fluid, or spinal fluid as the medium; and
   determining the presence of the target compound, the target compound being one or more of carcinoembryonic antigen (CEA), CD19, CD20, and CA 125.

* * * * *